United States Patent
Shudo (10) Patent No.: US 9,632,696 B2
(45) Date of Patent: Apr. 25, 2017

(54) PRESENTATION SYSTEM TO FACILITATE THE ASSOCIATION OF HANDWRITING INPUT BY A PARTICIPANT USER WITH A PAGE OF A PRESENTATION

(75) Inventor: Takao Shudo, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 13/115,595

(22) Filed: May 25, 2011

(65) Prior Publication Data
US 2011/0296297 A1 Dec. 1, 2011

(30) Foreign Application Priority Data
May 31, 2010 (JP) .................................. 2010-124132

(51) Int. Cl.
G06F 17/00 (2006.01)
G06F 3/0488 (2013.01)
G06F 17/24 (2006.01)

(52) U.S. Cl.
CPC ........ G06F 3/04883 (2013.01); G06F 17/241 (2013.01); G06F 17/242 (2013.01)

(58) Field of Classification Search
CPC ..................................................... G06F 17/241
USPC ......................................................... 715/241
See application file for complete search history.

(56) References Cited

U.S. PATENT DOCUMENTS

| 4,603,330 | A | * | 7/1986 | Horne | G09G 5/22 345/467 |
| 5,620,245 | A | * | 4/1997 | Kobayashi | G02B 27/0101 353/28 |
| 5,680,636 | A | * | 10/1997 | Levine | G06F 3/033 715/201 |
| 5,764,227 | A | * | 6/1998 | Ishimine | G06F 3/0483 715/207 |

(Continued)

FOREIGN PATENT DOCUMENTS

| CN | 101114260 | 1/2008 |
| CN | 101180877 | 5/2008 |

(Continued)

OTHER PUBLICATIONS

Notice of Allowance mailed Apr. 17, 2012, directed to Japanese Application No. 2010-124132; 6 pages.

(Continued)

*Primary Examiner* — Laurie Ries
(74) *Attorney, Agent, or Firm* — Osha Liang LLP (57) ABSTRACT

A display device for displaying presentation data including multiple pages, which receives the presentation data and a page number of a page displayed from a presenter device. An image of a page having the received page number from among the multiple pages is displayed in a follow mode, and an image of any given page from among the multiple pages is displayed in a write mode. A handwritten image is detected in the write mode, associated with a page number of a page displayed, and temporarily stored when a follow mode set instruction is accepted in the write mode. If a return (Continued)

instruction is accepted in the follow mode, the handwritten image specified by the temporary storage data is displayed superimposed on an image of the page having a page number specified by the stored temporary storage data among the multiple pages of the presentation data.

16 Claims, 8 Drawing Sheets

(56) References Cited

U.S. PATENT DOCUMENTS

| | | | | |
|---|---|---|---|---|
| 5,966,121 | A * | 10/1999 | Hubbell | H04N 21/435 375/E7.024 |
| 5,991,781 | A * | 11/1999 | Nielsen | G06F 3/16 715/236 |
| 6,583,813 | B1 * | 6/2003 | Enright | G06Q 20/18 348/143 |
| 7,092,002 | B2 * | 8/2006 | Ferren | H04N 7/15 348/14.08 |
| 7,383,495 | B2 * | 6/2008 | Dontcheva | G06F 17/241 715/200 |
| 7,849,476 | B2 * | 12/2010 | Stevens et al. | 725/34 |
| 8,019,817 | B2 | 9/2011 | Yoshida et al. | |
| 8,228,299 | B1 * | 7/2012 | Maloney | G06Q 20/14 345/173 |
| 2002/0008692 | A1 * | 1/2002 | Omura | G06F 1/16 345/173 |
| 2004/0237033 | A1 * | 11/2004 | Woolf | G06F 17/242 715/211 |
| 2005/0125717 | A1 * | 6/2005 | Segal et al. | 715/512 |
| 2005/0289453 | A1 * | 12/2005 | Segal | G06F 1/12 715/203 |
| 2006/0013508 | A1 * | 1/2006 | Morichika | 382/312 |
| 2007/0076984 | A1 * | 4/2007 | Takahashi | G06K 9/2054 382/305 |
| 2007/0282948 | A1 * | 12/2007 | Praino | G06Q 10/10 709/204 |
| 2009/0003733 | A1 * | 1/2009 | Osakabe | G06F 3/0321 382/314 |
| 2009/0037821 | A1 * | 2/2009 | O'Neal et al. | 715/732 |
| 2009/0317784 | A1 | 12/2009 | Syou et al. | |
| 2009/0327896 | A1 * | 12/2009 | Pall et al. | 715/730 |
| 2010/0037151 | A1 * | 2/2010 | Ackerman | G06Q 10/10 715/753 |

FOREIGN PATENT DOCUMENTS

| | | |
|---|---|---|
| CN | 101267326 | 9/2008 |
| JP | 9-297656 | 11/1997 |
| JP | 11-305335 | 11/1999 |
| JP | 2000-200237 | 7/2000 |
| JP | 2006-331309 | 12/2006 |
| JP | 2008-242301 | 10/2008 |
| JP | 2009-75238 | 4/2009 |
| JP | 2010-33229 | 2/2010 |

OTHER PUBLICATIONS

Second Office Action dated Aug. 26, 2013, directed to Chinese Application No. 201110147558.9; 10 pages.
Office Action issued in counterpart Chinese application No. 201110147558.9, mailed Mar. 20, 2014 (12 pages).
Notification of the First Office Action dated Feb. 5, 2013, directed to CN Application No. 201110147558.9; 7 pages.
Office Action in corresponding Chinese Patent Application No. 201110147558.9 dated Mar. 31, 2016, with translation (14 pages).

* cited by examiner

PRESENTATION SYSTEM TO FACILITATE THE ASSOCIATION OF HANDWRITING INPUT BY A PARTICIPANT USER WITH A PAGE OF A PRESENTATION

This application is based on Japanese Patent Application No. 2010-124132 filed with Japan Patent Office on May 31, 2010, the entire content of which is hereby incorporated by reference.

BACKGROUND OF THE INVENTION

Field of the Invention

The present invention relates to a display device, a display method, and a computer-readable non-transitory recording medium encoded with a display program, and more particularly to a display device on which document data can be viewed, a display method executed in the display device, and a computer-readable non-transitory recording medium encoded with a display program.

Description of the Related Art

There has been proposed a meeting system in which a presenter in a meeting allows a projector to display an image of a presentation material on a screen and also allows a computer in front of a meeting participant to display the same image of a page as an image of a page projected on the screen. There has also been developed a technique in which a participant allows a computer at hand to store a handwritten image while displaying an image of a presentation material.

However, while a participant is inputting an image by hand, a page displayed on the screen may be changed, and in such a case, the participant is unable to secure the time to input an image by hand. On the other hand, an image of a page different from the page displayed on the screen may be displayed while the user is inputting an image by hand. In such a case, after inputting a handwritten image, in order to display the image of the same page as the page on the screen, the participant has to search for the image of that page. The operation is thus cumbersome. Furthermore, the participant may sometimes wish to display the image of the same page as the page on the screen during inputting an image by hand and thereafter to resume the inputting the image by hand again on the image of the initial page.

SUMMARY OF THE INVENTION

The present invention is made to solve the aforementioned problem. An object of the invention is to provide a display device to facilitate the operation of switching a page to be displayed among a plurality of pages.

Another object of the invention is to provide a display method to facilitate the operation of switching a page to be displayed among a plurality of pages.

A further aspect of the invention is to provide a computer-readable non-transitory recording medium encoded with a display program to facilitate the operation of switching a page to be displayed among a plurality of pages.

In accordance with an aspect of the present invention, a display device displaying presentation data composed of a plurality of pages includes: a presentation data reception portion to receive the presentation data from a presenter device; a page number reception portion to receive from the presenter device a page number of a page displayed by the presenter device among a plurality of pages included in the presentation data; a display control portion to display an image of a page having the received page number among a plurality of pages included in the presentation data, in a follow mode, and to display an image of any given page of a plurality of pages included in the presentation data, in a write mode; a handwritten image detection portion to detect a handwritten image in the write mode; a temporary storage portion to, if a follow mode set instruction to set the follow mode is accepted in the write mode, store temporary storage data in which a handwritten image detected by the handwritten image detection portion is associated with a page number of a page displayed by the display control portion at a time when the follow mode set instruction is accepted, among a plurality of pages included in the presentation data; and a return control portion to, if a return instruction is accepted in the follow mode, allow the display control portion to display an image in which a handwritten image specified by the temporary storage data is superimposed on an image of a page having a page number specified by the stored temporary storage data among a plurality of pages included in the presentation data.

In accordance with another aspect of the present invention, a display method is executed in a display device displaying presentation data composed of a plurality of pages. The method includes: a step of receiving the presentation data from a presenter device; a step of receiving from the presenter device a page number of a page displayed by the presenter device among a plurality of pages included in the presentation data; a first display step of displaying an image of a page having the received page number among a plurality of pages included in the presentation data, in a follow mode, and of displaying an image of any given page among a plurality of pages included in the presentation data, in a write mode; a handwritten image detection step of detecting a handwritten image in the write mode; a step of, if a follow mode set instruction to set the follow mode is accepted in the write mode, storing temporary storage data in which a handwritten image detected in the handwritten image detection step is associated with a page number of a page displayed in the first display step at a time when the follow mode set instruction is accepted, among a plurality of pages included in the presentation data; and a second display step of, if a return instruction is accepted in the follow mode, displaying an image in which a handwritten image specified by the temporary storage data is superimposed on an image of a page having a page number specified by the stored temporary storage data among a plurality of pages included in the presentation data.

In accordance with a further aspect of the present invention, a computer-readable non-transitory recording medium encoded with a display program is executed in a computer controlling a display device displaying presentation data composed of a plurality of pages. The display program causes the computer to execute processing comprising: a step of receiving the presentation data from a presenter device; a step of receiving from the presenter device a page number of a page displayed by the presenter device among a plurality of pages included in the presentation data; a first display step of displaying an image of a page having the received page number among a plurality of pages included in the presentation data, in a follow mode, and of displaying an image of any given page among a plurality of pages included in the presentation data, in a write mode; a handwritten image detection step of detecting a handwritten image in the write mode; a step of, if a follow mode set instruction to set the follow mode is accepted in the write mode, storing temporary storage data in which a handwritten image detected in the handwritten image detection step is associated with a page number of a page displayed in the first display step at a time when the follow mode set instruction is accepted, among a plurality of pages included in the presentation data; and a second display step of, if a return instruction is accepted in the follow mode, displaying an image in which a handwritten image specified by the temporary storage data is superimposed on an image of a page having a page number specified by the stored temporary storage data among a plurality of pages included in the presentation data.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The preferred embodiments of the present invention will be described below in conjunction with the drawings. In the following description, the same or corresponding parts are denoted by the same reference characters. Their names and functions are also the same. Thus, a detailed description thereof will not be repeated.

Figure 1:
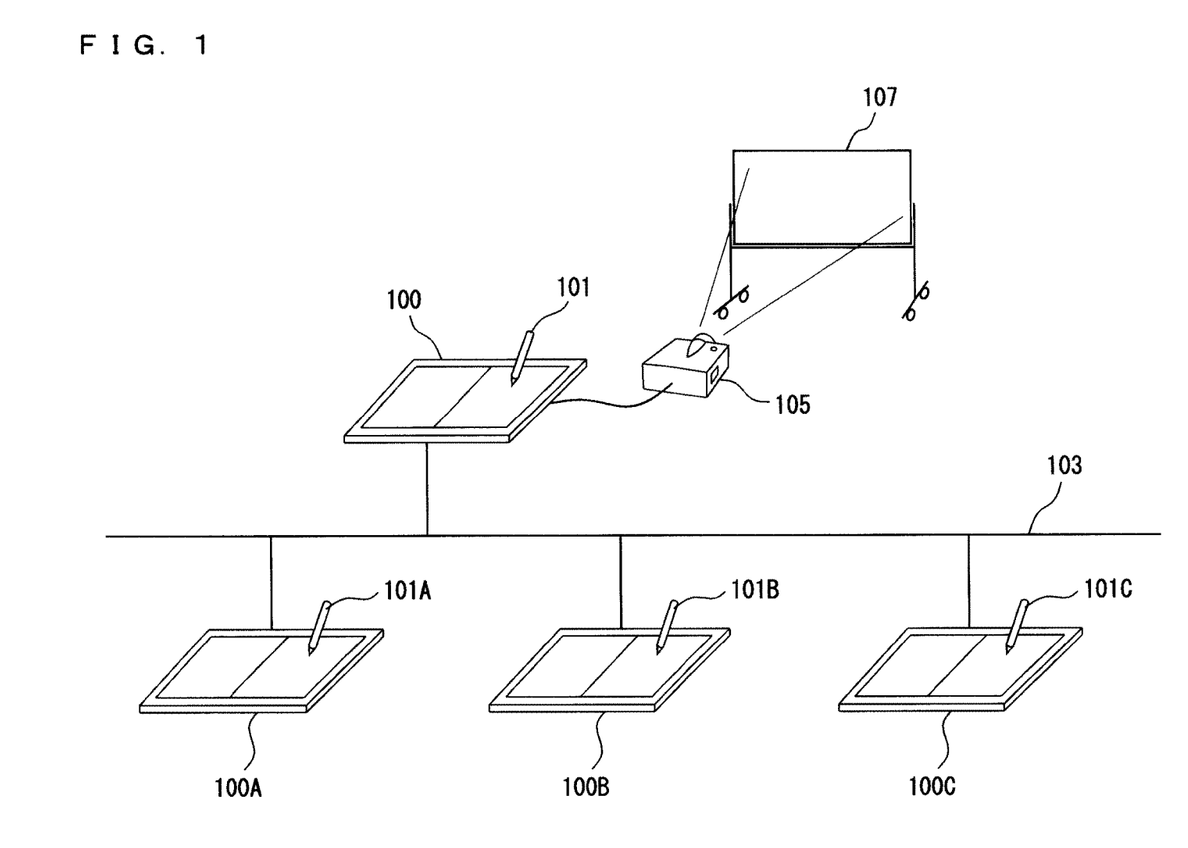
FIG. 1 is a diagram showing an overview of a meeting system in an embodiment of the present invention.

FIG. 1 is a diagram showing an overview of a meeting system in an embodiment of the present invention. Referring to FIG. 1, a meeting system 1 includes display devices 100, 100A-100C each being connected to a network 103, a projector 105 connected to display device 100, and a whiteboard 107.

Display devices 100, 100A, 100B, 100C each include a liquid crystal display (LCD) and a touch panel on a surface thereof. Users can view images displayed on LCD and can input handwritten characters or graphics on the touch panels using pens 101, 101A, 101B, 101C.

Here, a presenter operates display device 100 to allow projector 105 to project an image of a material on whiteboard 107, and participants operate display devices 100A-100C and view the material, by way of example. Of display devices 100, 100A-100C, display device 100 operated by the presenter is referred to as presenter device 100, and display devices 100A-100C operated by the participants are referred to as participant devices 100A-100C.

Network 103 is a local area network (LAN), either wired or wireless. Network 103 is not limited to LAN and may be a wide area network (WAN), a public switched telephone network (PSTN), the Internet, or the like.

Although here a presentation is given in one meeting room, by way of example, participants may be present in a plurality of spaces physically away from each other. In this case, a participant in another meeting room cannot see an image projected on whiteboard 107 but can see the same image as the image projected on whiteboard 107, since the image is displayed on the display device operated by the participant. The presenter's voice can be transmitted through network 103 or a telephone line and output from a speaker.

Projector 105 is connected to display device 100 via a serial line and displays an image on whiteboard 107 by projecting an image received from display device 100 onto whiteboard 107. It may be connected via network 103 instead of a serial line. Projector 105 includes a liquid crystal display (LCD), a lens, and a light source, and displays externally input data. Light emitted from the light source passes through the liquid crystal display and radiates to the outside through the lens. When light from a projection unit is applied to whiteboard 107, an enlarged image of the image displayed on the liquid crystal display is projected on whiteboard 107. Any plane with high reflectivity such as a wall may be used, and in such a case, whiteboard 107 does not have to be installed. Although here projector 105 is illustrated by way of example, any display such as an LCD or organic ELD may be used.

Display devices 100, 100A, 100B, 100C have the same hardware configuration, and therefore, display device 100 will be described here as an example. In the following description, the components of display devices 100A, 100B, 100C are labeled with suffixes "A," "B," "C," respectively, to the numerals denoting the same components of display device 100.

Figure 2:
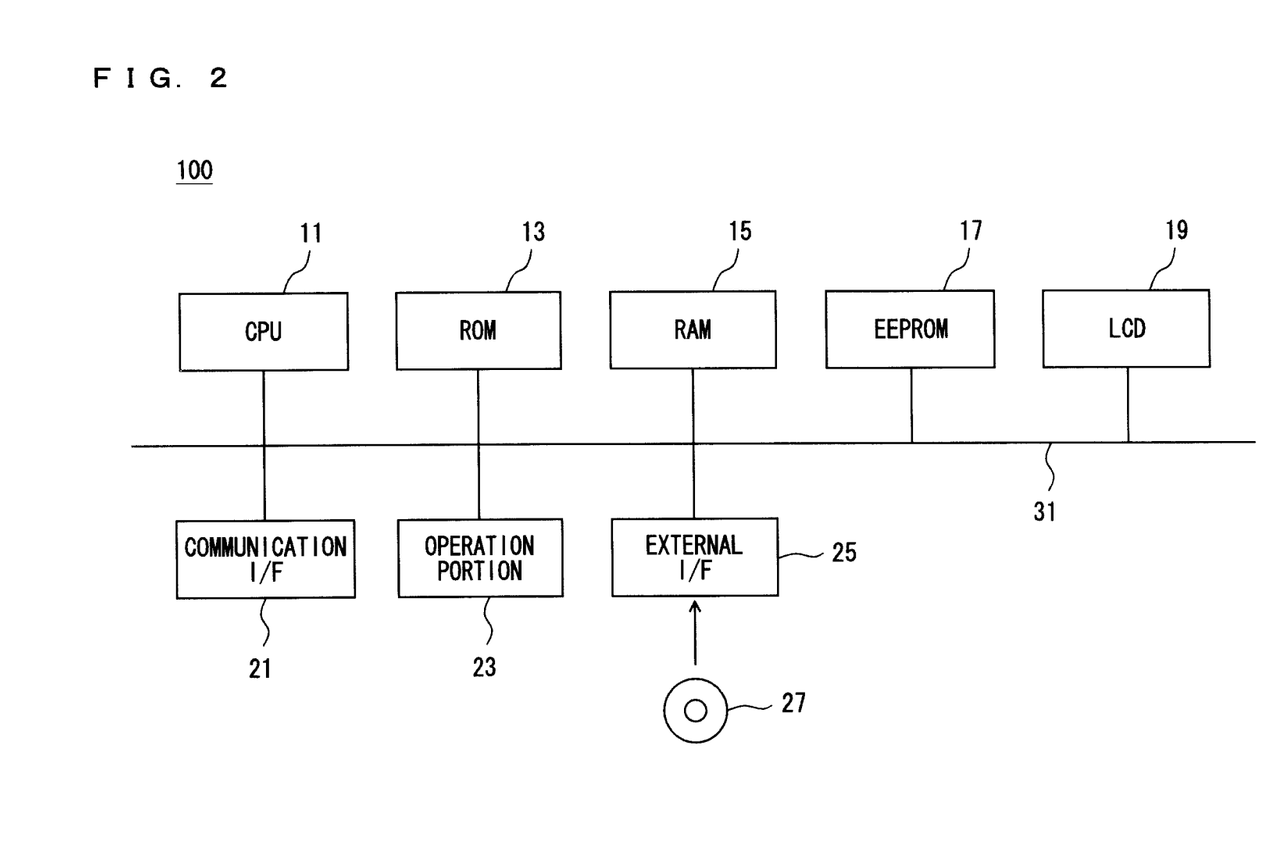
FIG. 2 is a block diagram showing an exemplary hardware configuration of a display device.

FIG. 2 is a block diagram showing an exemplary hardware configuration of the display device. Referring to FIG. 2, display device 100 includes a CPU (Central Processing Unit) 11 controlling the entire display device 100, a ROM (Read Only Memory) 13, a RAM (Random Access Memory) 15, an EEPROM (Electronically Erasable and Programmable ROM) 17, an LCD (Liquid Crystal Display) 19, a communication interface (I/F) 21 for connecting display device 100 to network 103, an operation portion 23 accepting user's operations, and an external I/F 25.

ROM 13 stores a program executed by CPU 11 or data necessary to execute the program. RAM 15 is used as a work area for CPU 11 to execute a program. EEPROM 17 stores a program, data, and the like in a nonvolatile manner.

LCD 19 is provided on the top of display device 100 and is controlled by CPU 11 to display an image. Any device that displays an image, such as an organic Electroluminescence Display (ELD) or electronic paper, or a combination thereof may be used in place of LCD 19.

Operation portion 23 includes a plurality of keys and a touch panel provided on the top surface of LCD 19 and can accept a variety of operations through combinations of LCD 19 and the touch panel. The touch panel detects a location pointed to on operation portion 23 by the user. Communication I/F 21 is an interface for connecting display device 100 to network 103. CPU 11 communicates with other display devices 100A, 100B, 100C through communication I/F 21 to send and receive data. Communication I/F 21 can also communicate with a computer connected to the Internet via network 103.

External I/F 25 is an interface for communicating with an external device. Here, external I/F 25 communicates serially with the connected external device. Projector 105 is connected to external I/F 25, and CPU 11 controls projector 105 through external I/F 25 and transmits an image to projector 105 to project an image. When a CD-ROM driver is connected to external I/F 25, CPU 11 can access a CD (Compact Disk)-ROM 27 through external I/F 25. Presentation data or a program may be stored in CD-ROM 27, and CPU 11 can read out and display the presentation data stored in CD-ROM 27 and can load the program stored in CD-ROM 27 into RAM 15 for execution.

The program executed by CPU 11 is not limited to the program stored in CD-ROM 27, and the program stored in EEPROM 17 may be loaded into RAM 15 for execution. In this case, another computer connected to network 103 may overwrite the program stored in EEPROM 17 of display device 100 or may additionally write a new program. Display device 100 may download a program from another computer connected to network 103 and store the program into EEPROM 17. The program referred to herein includes not only a program directly executable by CPU 11 but also a source program, a compressed program, an encrypted program, and the like.

Figure 3:
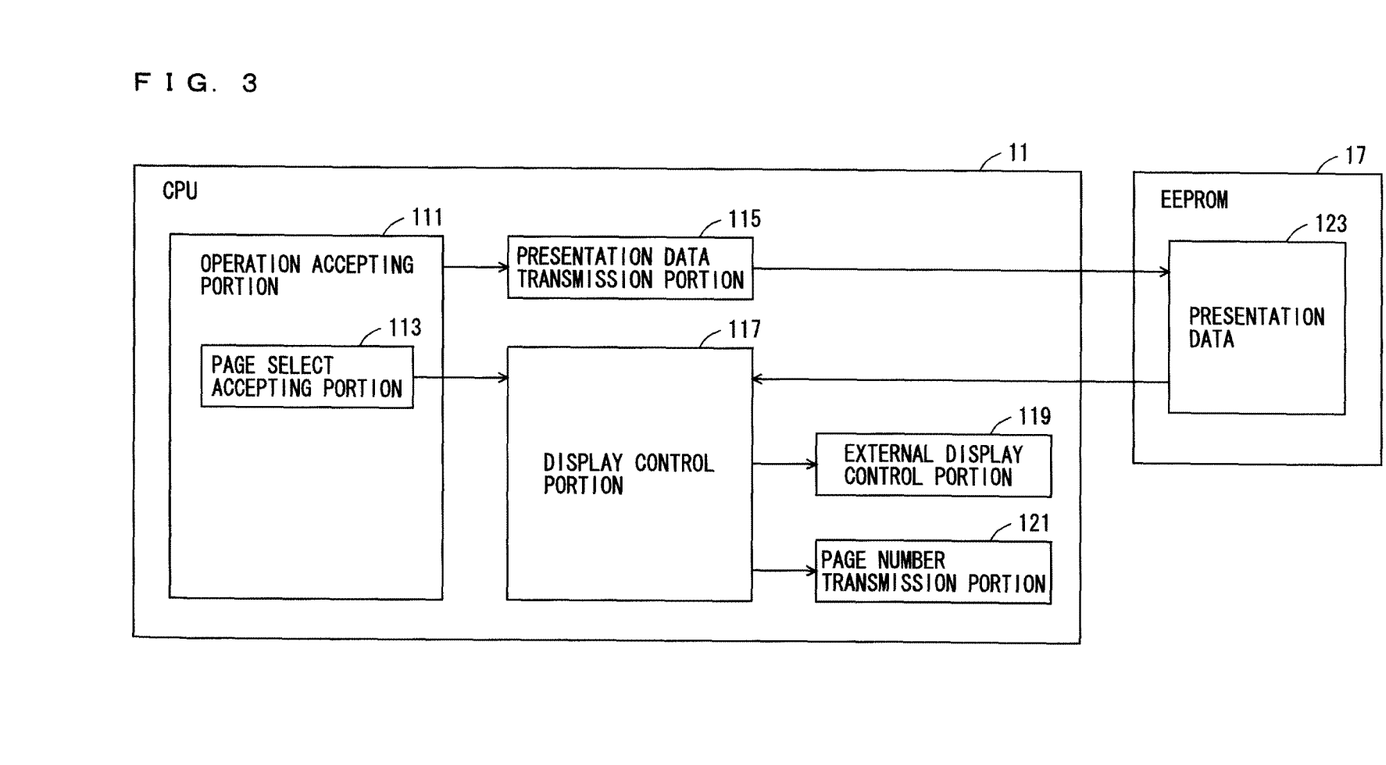
FIG. 3 is a functional block diagram showing exemplary functions of CPU of a display device serving as a presenter device, together with data stored in EEPROM.

FIG. 3 is a functional block diagram showing exemplary functions of CPU of the display device serving as a presenter device, together with data stored in EEPROM. The functions of CPU 11 shown in FIG. 3 are implemented by CPU 11 executing the display program stored in ROM 13, EEPROM 17, or CD-ROM 27. Referring to FIG. 3, CPU 11 included in presenter device 100 includes an operation accepting portion 111 accepting the user's operation, a presentation data transmission portion 115 transmitting presentation data, a display control portion 117 controlling display of LCD 19, an external display control portion 119 controlling projector 105, and a page number transmission portion 121 transmitting a page number of a page that is being displayed.

EEPROM 17 stores presentation data 123. Here, the presentation data is image data composed of a plurality of pages, for example, in a file format such as TIFF (Tagged Image File Format), GIF (Graphic Interchange Format), JPEG (Joint Photographic Experts Group), or PDF (Portable Document Format). When CPU 11 executes an application program such as a document creation program or a spreadsheet program, the presentation data may be created by CPU 11 executing the application program. In summary, the presentation data is data stored in EEPROM 17, which is stored in advance in EEPROM 17 by the user of display device 100.

Operation accepting portion 111 accepts an operation input to operation portion 23 by the user. Operation accepting portion 111 displays a file list when the user inputs an instruction to operation portion 23 to display a file list. The file list includes a file name for identifying data stored in EEPROM 17. If a plurality of data is stored in EEPROM 17, the file list includes a plurality of file names for identifying a plurality of data. When the user inputs an operation to operation portion 23 to select a file name included in the file list, operation accepting portion 111 outputs a select instruction to presentation data transmission portion 115 and display control portion 117. Here, the user inputs an operation to select a file name of presentation data 123, by way of example. The select instruction includes a file name selected by the user.

Operation accepting portion 111 includes a page select accepting portion 113. Page select accepting portion 113 outputs a page down signal to display control portion 117 when a page down button included in operation portion 23 is designated by the user. On the other hand, page select accepting portion 113 outputs a page up signal to display control portion 117 when a page up button included in operation portion 23 is designated by the user.

Presentation data transmission portion 115 reads out, from EEPROM 17, presentation data 123 specified by the file name included in the select instruction input from operation accepting portion 111 among a plurality of presentation data 123 stored in EEPROM 17, and transmits the read presentation data to each of participant devices 100A-100C through communication I/F portion 21.

When the select instruction is input from operation accepting portion 111, display control portion 117 reads out, from EEPROM 17, the presentation data specified by the file name included in the input select instruction, and displays, on LCD 19, an image of a page having the first page number among a plurality of pages included in the read presentation data. Then, when a page down signal is input from page select accepting portion 113, display control portion 117 displays, on LCD 19, an image of a page having a page number immediately following (one larger than) the page number of the page appearing at the time when the page down signal is input. On the other hand, when a page up signal is input from page select accepting portion 113, display control portion 117 displays, on LCD 19, an image of a page having a page number immediately preceding (one smaller than) the page number of the page appearing at the time when the page up signal is input.

Whenever switching an image of a page displayed on LCD 19, display control portion 117 outputs an image of a page displayed on LCD 19 after the switching to external display control portion 119 and outputs the page number of the page displayed on LCD 19 after the switching to page number transmission portion 121.

When a page number is input from display control portion 117, page number transmission portion 121 transmits the page number input from display control portion 117 to each of participant devices 100A-100C through communication I/F portion 21. In other words, whenever display control portion 117 switches an image of a page displayed on LCD 19, page number transmission portion 121 transmits the page number of the page displayed on LCD 19 after the switching to each of participant devices 100A-100C.

External display control portion 119 controls projector 105 and allows projector 105 to display an image. When an image of a page is input from display control portion 117, external display control portion 119 transmits the image of the input page to projector 105 and allows projector 105 to display the image of the input page. In other words, whenever display control portion 117 switches an image of a page displayed on LCD 19, external display control portion 119 allows projector 105 to display the image of the page displayed on LCD 19 after the switching. Therefore, the image displayed on LCD 19 and the image displayed by projector 105 are the same.

Figure 4:
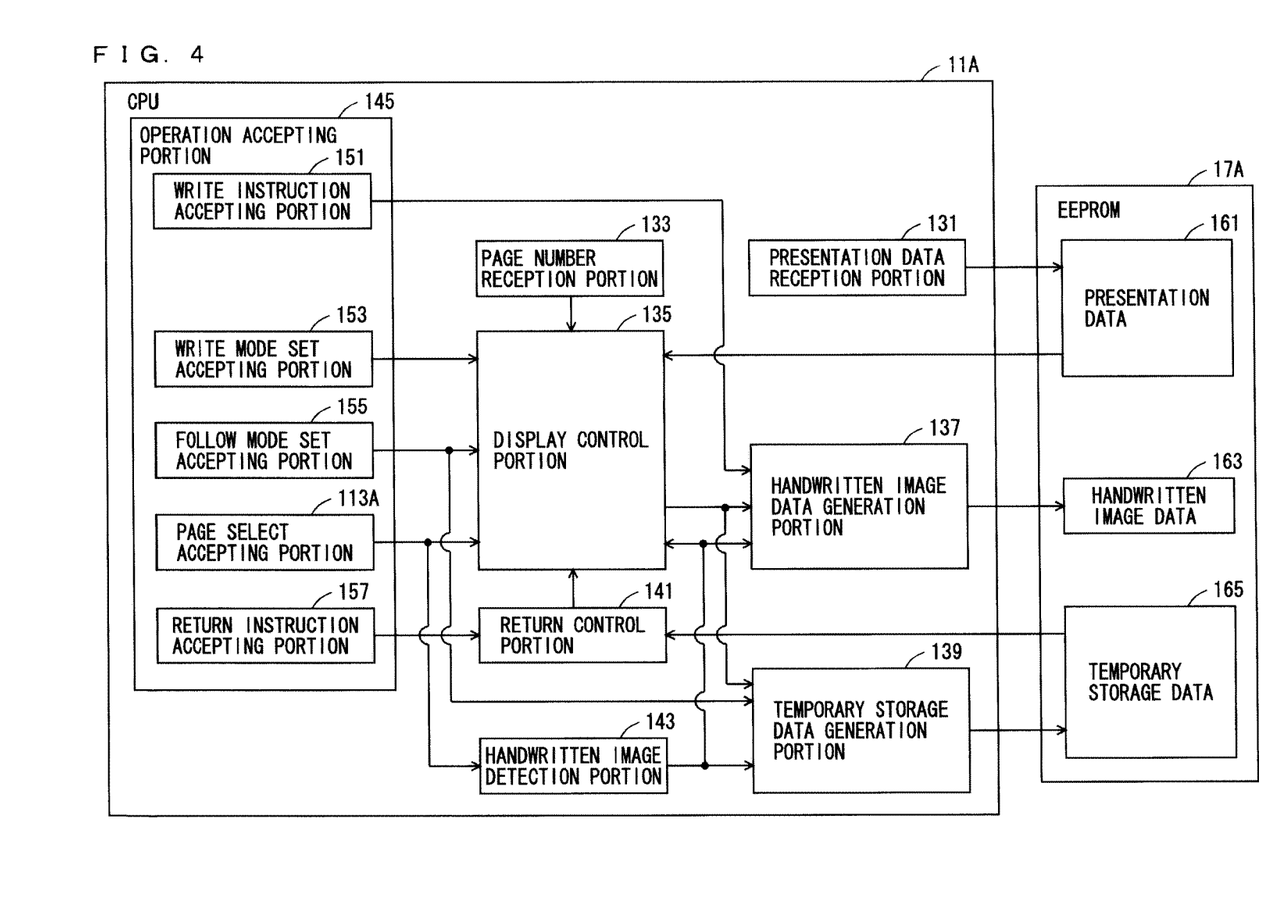
FIG. 4 is a functional block diagram showing exemplary functions of CPU of a display device serving as a participant device, together with data stored in EEPROM.

FIG. 4 is a functional block diagram showing exemplary functions of CPU of the display device serving as a participant device, together with data stored in EEPROM. Here, participant devices 100A, 100B, 100C have the same functions and therefore CPU 11A of participant device 100A will be describe here. The functions of CPU 11A shown in FIG. 4 are implemented by CPU 11A executing the display program stored in ROM 13A, EEPROM 17A, or CD-ROM 27.

Referring to FIG. 4, CPU 11A of display device 100A serving as a participant device includes operation accepting portion 151 accepting the user's operation, a display control portion 135 controlling LCD 19A, a presentation data reception portion 131 receiving presentation data, a page number reception portion 133 receiving a page number, a handwritten image detection portion 143 detecting a handwritten image, a handwritten image data generation portion 137 generating handwritten image data, a temporary storage data generation portion 139 generating temporary storage data, and a return control portion 141 controlling display control portion 135.

Operation accepting portion 151 sets a mode to either a follow mode or a write mode. The follow mode is an operation mode to display an image of a page having the same page number as that of the page displayed by presenter device 100 among a plurality of pages included in presentation data. The write mode is an operation mode to accept an image handwritten by the user and to associate the accepted handwritten image with any given page of a plurality of images included in presentation data.

Operation accepting portion 151 includes a write instruction accepting portion 151, a write mode set accepting portion 153, a follow mode set accepting portion 155, a page select accepting portion 113A, and a return instruction accepting portion 157.

When the user designates a follow mode set button provided beforehand in operation portion 23A, during the write mode, follow mode set accepting portion 155 accepts a follow mode set instruction from operation portion 23A. Upon accepting the follow mode set instruction, follow mode set accepting portion 155 sets the follow mode and outputs a follow mode set signal to display control portion 135 and temporary storage data generation portion 139.

When the user designates a write mode set button provided beforehand in operation portion 23A, during the follow mode, write mode set accepting portion 153 accepts a write mode set instruction from operation portion 23A. Upon accepting the write mode set instruction, write mode set accepting portion 153 sets the write mode and outputs a write mode set signal to display control portion 135.

When the user designates a write button provided beforehand in operation portion 23A, during the write mode, write instruction accepting portion 151 accepts a write instruction from operation portion 23A. Upon accepting the write instruction, write instruction accepting portion 151 outputs a write signal to handwritten image data generation portion 137.

When the user designates a return button provided beforehand in operation portion 23A, during the follow mode, return instruction accepting portion 157 accepts a return instruction from operation portion 23A. The return button is enabled on the condition that temporary storage data 165 described later is stored in EEPROM 17A. Here, during the follow mode, return instruction accepting portion 157 displays the return button on LCD 19 if temporary storage data 165 is stored in EEPROM 17A, and does not display the return button on LCD 19 if temporary storage data 165 is not stored. Upon accepting the return instruction from operation portion 23A, return instruction accepting portion 157 sets the write mode and outputs a return signal to return control portion 141.

Presentation data reception portion 131 controls communication I/F portion 21A to receive the presentation data transmitted from presenter device 100. Presentation data reception portion 131 stores the received presentation data into EEPROM 17A. Presentation data 161 is thus stored in EEPROM 17A.

Page number reception portion 133 controls communication I/F portion 21A to receive a page number transmitted by presenter device 100. Page number reception portion 133 outputs the received page number to display control portion 135.

The operation of CPU 11A will be described below in the follow mode and in the write mode.

<Operation in Follow Mode>

Display control portion 135 reads out from EPROM 17A presentation data 161 stored in EEPROM 17A and displays on LCD 19A an image of a page specified by the page number input from page number reception portion 133 among a plurality of pages included in the read presentation data. In other words, display control portion 135 displays the same image as the image of the page displayed by presenter device 100 among a plurality of pages included in the presentation data received from presenter device 100.

<Operation in Write Mode>

Page select accepting portion 113A outputs a page down signal to display control portion 117 and handwritten image detection portion 143 when the page down button included in operation portion 23A is designated by the user. Page select accepting portion 113 outputs a page up button to display control portion 117 and handwritten image detection portion 143 whenever the page up button included in operation portion 23A is designated by the user.

Display control portion 135 reads out from EEPROM 17A presentation data 161 stored in EEPROM 17A and displays on LCD 19A the image of the page designated by the user among a plurality of pages included in the read presentation data 161. When the setting is switched from the follow mode to the write mode, the image of the page displayed in the follow mode before the switching continues to be displayed. When the setting is switched from the follow mode to the write mode, an image of any given page may be displayed.

When a page down signal is input from page select accepting portion 113A, display control portion 135 displays on LCD 19A an image of a page having the page number immediately after the page number of the page displayed at the time when the page down signal is input. On the other hand, when a page up signal is input from page select accepting portion 113, display control portion 135 displays on LCD 19A an image of a page having the page number immediately before the page number of the page displayed at the time when the page up signal is input. Display control portion 135 outputs the page number of the displayed page among a plurality of pages included in presentation data 161 to handwritten image data generation portion 137 and temporary storage data generation portion 139.

Handwritten image detection portion 143 detects a handwritten image which is handwritten by the user on the touch panel of operation portion 23A. Specifically, when the user points to a location on the touch panel of operation portion 23A, handwritten image detection portion 143 receives positional information indicating the pointed location from operation portion 23A. Handwritten image detection portion 143 detects a handwritten image by setting the value of the pixel specified by the positional information input from operation portion 23A to "1" in a handwritten image in which the values of all the pixels are "0." Whenever positional information is input from operation portion 23A, handwritten image detection portion 143 updates the handwritten image. Handwritten image detection portion 143 outputs the detected handwritten image to handwritten image data generation portion 137, display control portion 135, and temporary storage data generation portion 139.

When a page down signal or a page up signal is input from page select accepting portion 113A, in other words, when the displayed image is switched by display control portion 135, handwritten image detection portion 143 initializes the handwritten image. A handwritten image is initialized, for example, by setting the values of all the pixels of the handwritten image to "0."

When a handwritten image is input from handwritten image detection portion 143, display control portion 135 superimposes the input handwritten image on the image of the page displayed at the time when the handwritten image is input from handwritten image detection portion 143, and then displays the resultant image.

Handwritten image data generation portion 137 generates handwritten image data in response to input of a write signal from write instruction accepting portion 151 and stores the generated handwritten image data into EEPROM 17A. Handwritten image data 163 is thus stored in EEPROM 17A. The handwritten image data is data in which the page number of the page displayed by display control portion 135 at the time when the write signal is input is associated with the handwritten image input from handwritten image detection portion 143.

Whenever switching an image of a page to be displayed, display control portion 135 may refer to handwritten image data 163 stored in EEPROM 17A, and, if there exists a handwritten image associated with the page number of the page after the switching, may superimpose the handwritten image on the image of the page after the switching. Thus, the handwritten image written in the past may be displayed in association with the displayed image.

In response to input of a follow mode set signal from follow mode set accepting portion 155, temporary storage generation portion 139 generates temporary storage data in which the handwritten image input from handwritten image detection portion 143 is associated with the page number of the page displayed by display control portion 135, and then stores the generated temporary storage data into EEPROM 17A. Temporary storage data 165 is thus stored in EEPROM 17A.

When a return signal is input from return instruction accepting portion 157, return control portion 141 reads out temporary storage data 165 stored in EEPROM 17A and outputs the handwritten image and the page number included in the read temporary storage data 165 to display control portion 135. After outputting the handwritten image and the page number included in temporary storage data 165 to display control portion 135, return control portion 141 erases temporary storage data 165 from EEPROM 17A.

When a page number and a handwritten image are input from return control portion 141, display control portion 135 displays on LCD 19A the image of the page specified by the input page number among a plurality of pages included in the presentation data and displays the input handwritten image superimposed on the image of the displayed page. Therefore, display control portion 135 displays the same image as the image displayed on LCD 19A when the write mode is set immediately before the follow mode is set. Therefore, during handwriting in the write mode, the user may set the follow mode to display the image of the same page of the page presented by the presenter and thereafter may only input a return instruction to display the image of the page displayed when handwriting in the write mode, and the handwritten image. In this manner, the user can continue to input a handwritten image only with a simple operation of designating a return button preset in operation portion 23A.

Figure 5:
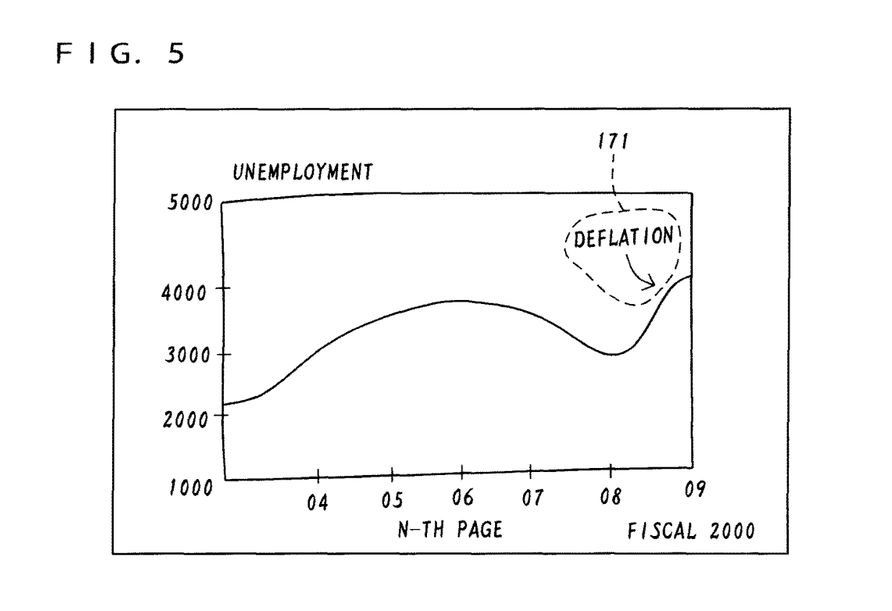
FIG. 5 is a first diagram showing an exemplary image displayed on the participant device set in a write mode.

FIG. 5 is a first diagram showing an exemplary image displayed on the participant device set in the write mode. Referring to FIG. 5, an image displayed on participant device 100A is an image formed by superimposing a handwritten image 171 on an image of the N-th page (where N is a positive integer) of the presentation data. Handwritten image 171 includes an image of a character string "DEFLATION." It is noted the dotted line in the figure is given only for the sake of illustration and actually does not exist. When the follow mode set button of operation portion 23A is designated while the image shown in FIG. 5 is being displayed, temporary storage data 165 in which handwritten image 171 and page number "N" are associated with each other is stored into EEPROM 17A, and the image of the page displayed on presenter device 100 is displayed on participant device 100A. Thereafter, when the return button of operation portion 23A is designated in the participant device, the same image as the image shown in FIG. 5 appears again.

Figure 6:
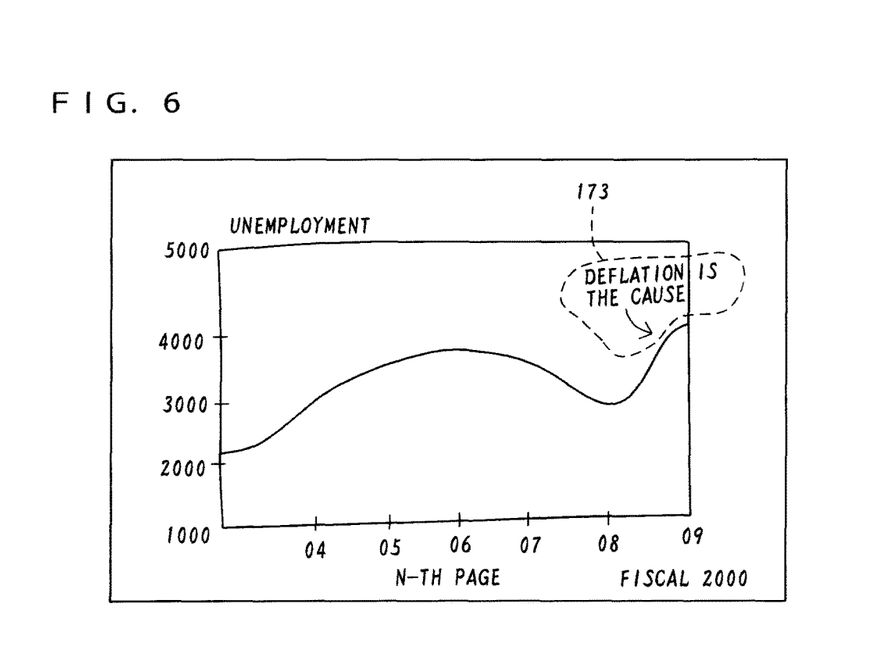
FIG. 6 is a second diagram showing an exemplary image displayed on the participant device set in the write mode.

FIG. 6 is a second diagram showing an exemplary image displayed on the participant device set in the write mode. The image shown in FIG. 6 shows the state in which after the image shown in FIG. 5 is displayed by designating the return button of operation portion 23A, the handwritten characters are continuously input. Here, handwritten image 171 included in the image shown in FIG. 5 includes "DEFLATION," and a character string "IS THE CAUSE" is added to handwritten image 171. The image shown in FIG. 6 includes the image and handwritten image 173 on the same page as included in the image shown in FIG. 5. The handwritten image includes an image of a character string "DEFLATION IS THE CAUSE." When the user designates the write button of operation portion 23A in the state in which the image shown in FIG. 6 is displayed, handwritten image data 163 in which handwritten image 173 and the page number "N" are associated with each other is stored in EEPROM 17A.

Figure 7:
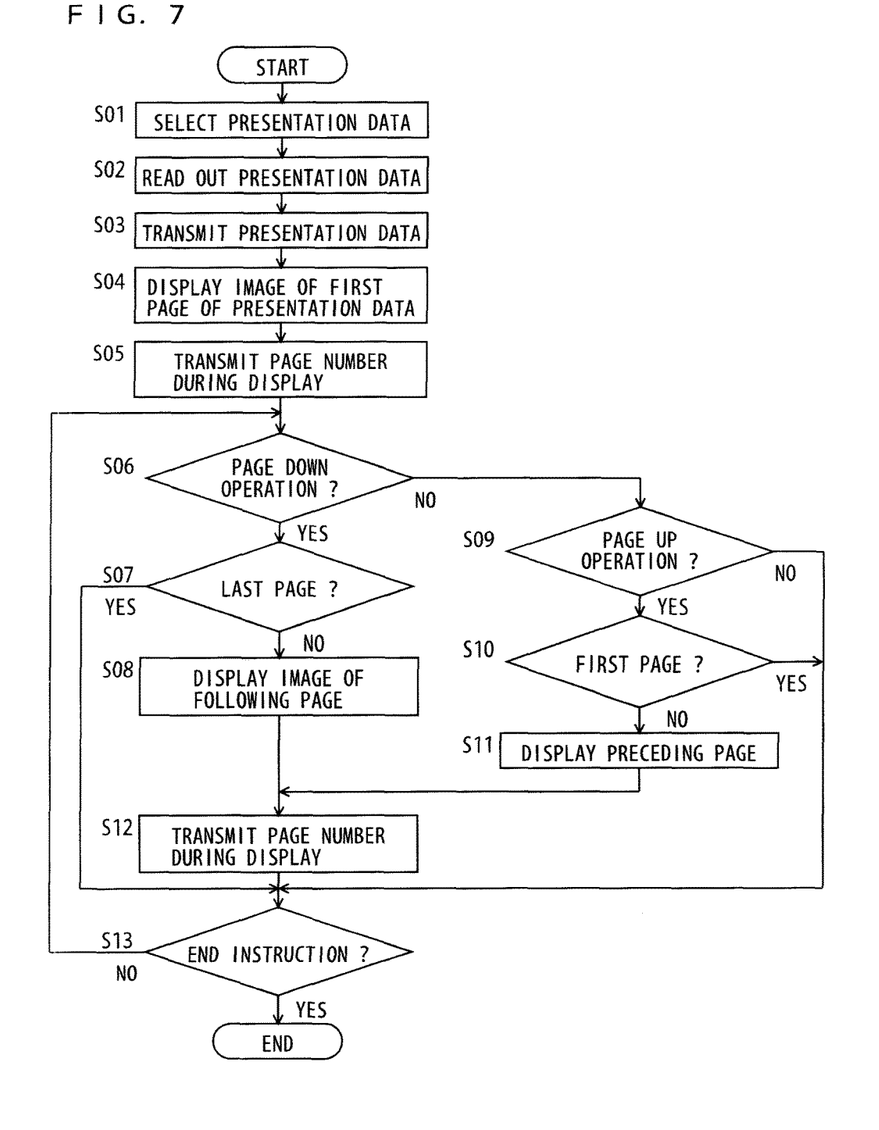
FIG. 7 is a flowchart showing an exemplary flow of a presenter-side display process.

FIG. 7 is a flowchart showing an exemplary flow of a presenter-side display process. The presenter-side display process is a process executed by CPU 11 of presenter device 100 executing a presenter-side display program stored in ROM 13 or EEPROM 17. The presenter-side display program is a part of the display program.

Referring to FIG. 7, CPU 11 accepts a selection of presentation data (step S01). In the next step S02, presentation data 123 selected in step S01 is read out from EEPROM 17, and the process proceeds to step S03. In step S03, presentation data 123 read out in step S02 is transmitted to each of participant devices 100A-100C, and the process proceeds to step S04. Specifically, CPU 11 transmits the presentation data to each of participant devices 100A-100C through communication I/F 21.

In step S04, the image of the first page of the presentation data read out in step S02 is displayed on LCD 19, and the process proceeds to step S05. In step S05, the page number of the page displayed on LCD 19 is transmitted to each of participant devices 100A-100C. The page number of the first page of the presentation data displayed in step S04 is transmitted to each of participant devices 100A-100C.

In step S06, it is determined whether an operation to move the page down is accepted. If an operation to move the page down is accepted, the process proceeds to step S07. If not, the process proceeds to step S09.

In step S07, it is determined whether the displayed page is the last page or not. If the displayed image is the last page, the process proceeds to step S13. If not, the process proceeds to step S08. In step S08, an image of the page having the page number immediately after the page number of the displayed image is displayed on LCD 19, and the process proceeds to step S12. In step S12, if the process proceeds from step S08, the page number of the page displayed in step S08 is transmitted to each of participant devices 100A-100C.

On the other hand, in step S09, it is determined whether an operation to move the page up is accepted. If an operation to move the page up is accepted, the process proceeds to step S10. If not, the process proceeds to step S13. In step S10, it is determined whether the displayed page is the first page. If the displayed page is the first page, the process proceeds to step S13. If not, the process proceeds to step S11. In step S11, an image of the page having the page number immediately before the page number of the displayed image is displayed on LCD 19, and the process proceeds to step S12. In step S12, if the process proceeds from step S11, the page number of the page displayed in step S11 is transmitted to each of participant devices 100A-100C.

In step S13, it is determined whether an end instruction is accepted. If an end instruction is accepted, the presenter-side display process is ended. If not, the process returns to step S06. The process from step S06 to step S13 is repeated until an end instruction is accepted in step S13, and whenever the displayed image is switched, the page number of the page displayed after the switching is transmitted to each of participant devices 100A, 100B, 100C.

Figure 8:
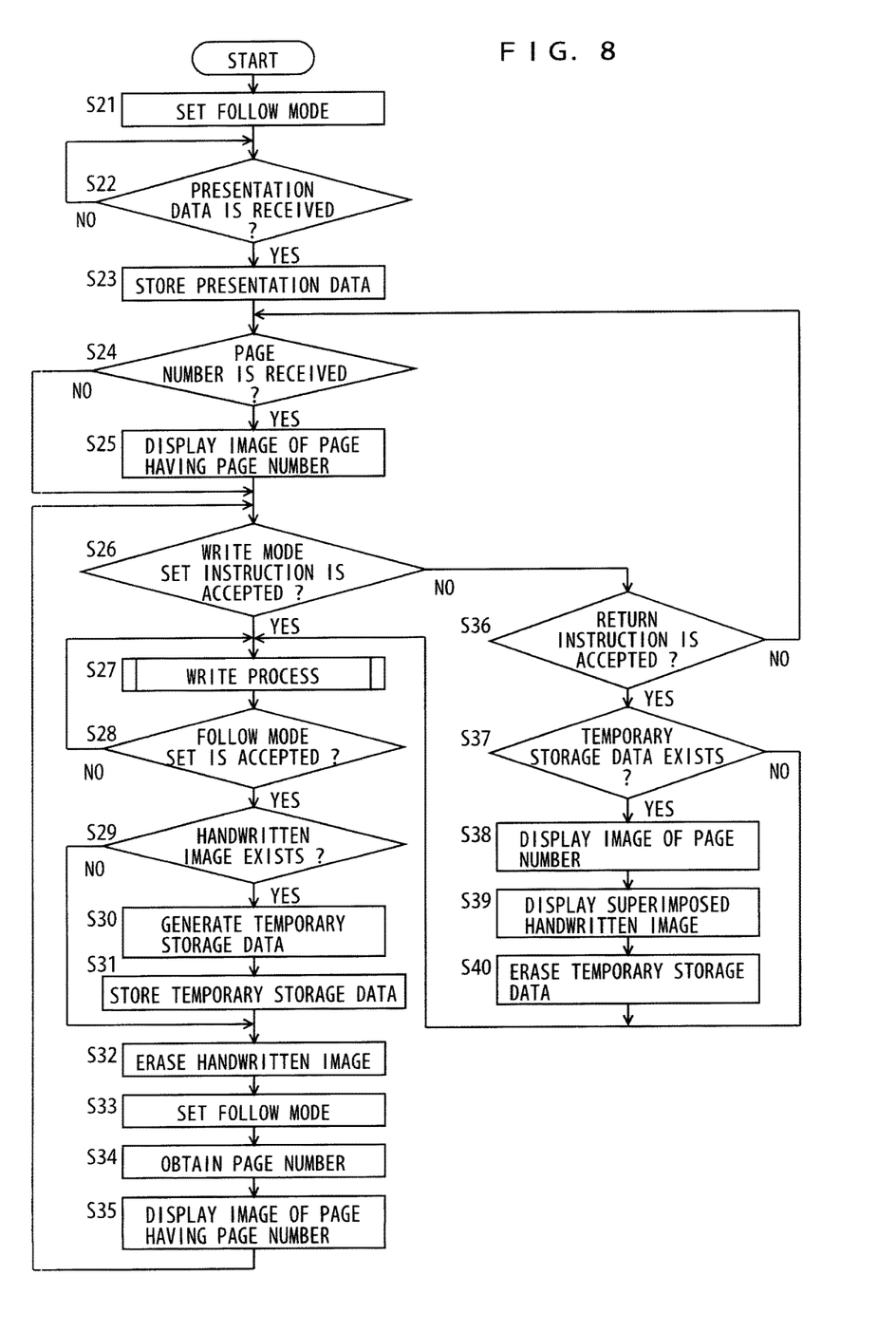
FIG. 8 is a flowchart showing an exemplary flow of a participant-side display process.

FIG. 8 is a flowchart showing an exemplary flow of a participant-side display process. The participant-side display process is a process executed by each of CPU 11A, 11B, 11C of participant devices 100A, 100B, 100C executing a participant-side display program stored in ROM 13A, 13B, 13C or EEPROM 17A, 17B, 17C. The participant-side display program is a part of the display program. Here, CPU 11A of participant device 100A executes the participant-side display program, by way of example.

Referring to FIG. 8, CPU 11A sets the follow mode (step S21), and the process proceeds to step S22. In step S22, it is determined whether presentation data is received. It is determined that presentation data is received if communication I/F 21 receives presentation data from presenter device 100. The process waits until presentation data is received (NO in step S02). If presentation data is received, the process proceeds to step S23. In step S23, the presentation data received in step S22 is stored into EEPROM 17A, and the process then proceeds to step S23. Presentation data 161 is thus stored in EEPROM 17A.

In step S24, it is determined whether a page number is received. It is determined that a page number is received if communication I/F 21 receives a page number from presenter device 100. The page number is the page number of the page displayed by presenter device 100. If a page number is received, the process proceeds to step S25. If not, step S25 is skipped and the process proceeds to step S26.

In step S25, an image of the page having the received page number is displayed on LCD 19A, among a plurality of pages included in presentation data 161 stored in EEPROM 17A. The process then proceeds to step S26.

In step S26, it is determined whether a write mode set instruction is accepted. If it is detected that the write mode set button of operation portion 23A is pressed, a write mode set instruction is accepted. If a write mode set instruction is accepted, the process proceeds to step S27. If not, the process proceeds to step S36.

In step S27, a write process is executed, and the process proceeds to step S28. The write process will be detailed later. In step S28, it is determined whether a follow mode set instruction is accepted. If it is detected that the follow mode set button of operation portion 23A is pressed, a follow mode set instruction is accepted. If a follow mode set instruction is accepted, the process proceeds to step S29. If not, the process returns to step S27. Therefore, the write process is executed until a follow mode set instruction is accepted after a write mode set instruction is accepted.

In step S29, it is determined whether there exists a handwritten image. If a handwritten image is detected in the write process executed in step S27, it is determined that there exists a handwritten image. If a handwritten image exists, the process proceeds to step S30. If a handwritten image does not exist, the process proceeds to step S32.

In step S30, temporary storage data is generated. Specifically, temporary storage data is generated which includes the handwritten image detected in step S29 and the page number of the page displayed on LCD 19A. The page displayed on LCD 19A is a page that is determined in the write process executed in step S27 and is determined arbitrarily by the participant who operates participant device 100A.

In the next step S31, the temporary storage data generated in step S30 is stored into EEPROM 17A, and the process then proceeds to step S32. In step S32, the handwritten image is erased, and the process proceeds to step S33. This is to enable the handwritten image only for the duration while the write process in step S27 is being executed. In step S33, the follow mode is set, and the process then proceeds to step S34.

In step S34, the page number transmitted from presenter device 100 is obtained. Then, an image of the page having the page number obtained in step S34 is displayed on LCD 19A (step S35), and the process then returns to step S26. Specifically, presentation data 161 stored in EEPROM 17A in step S23 is read out, and the image of the page specified by the page number obtained in step S34 is displayed among a plurality of pages included in the read presentation data 161.

On the other hand, in step S36, it is determined whether a return instruction is accepted. If it is detected that the return button of operation portion 23A is pressed, a return instruction is accepted. If a return instruction is accepted, the process proceeds to step S37. If not, the process returns to step S24.

In step S37, it is determined whether temporary storage data 165 is stored in EEPROM 17A. If temporary storage data 165 is stored in EEPROM 17A, the process proceeds to step S38. If not, the process proceeds to step S27. In other words, the process from step S38 to step S40 is executed on the condition that temporary storage data 165 is stored in EEPROM 17A.

In step S38, an image of the page specified by the page number included in temporary storage data 165 is displayed on LCD 19A, among a plurality of pages included in the presentation data stored in EEPROM 17A. In the next step S39, the handwritten image included in temporary storage data 165 stored in EEPROM 17A is displayed superimposed on the image of the page displayed on LCD 19A. In the next step S40, temporary storage data 165 stored in EEPROM 17A is erased, and the process proceeds to step S27. This is to enable temporary storage data 165 only one time after a return instruction is accepted. Temporary storage data 165 is not erased from EEPROM 17A unless a return instruction is accepted. Therefore, even when a return instruction is accepted during the write mode, as long as temporary storage data 165 is stored in EEPROM 17A, the process from step S38 to step S40 is executed.

In the participant-side display process shown in FIG. 8, the user inputs an end instruction to generate an interrupt, so that the participant-side display process ends. The end instruction may be transmitted from presenter device 100 or may input to participant device 100A by the participant who operates participant device 100A.

Figure 9:
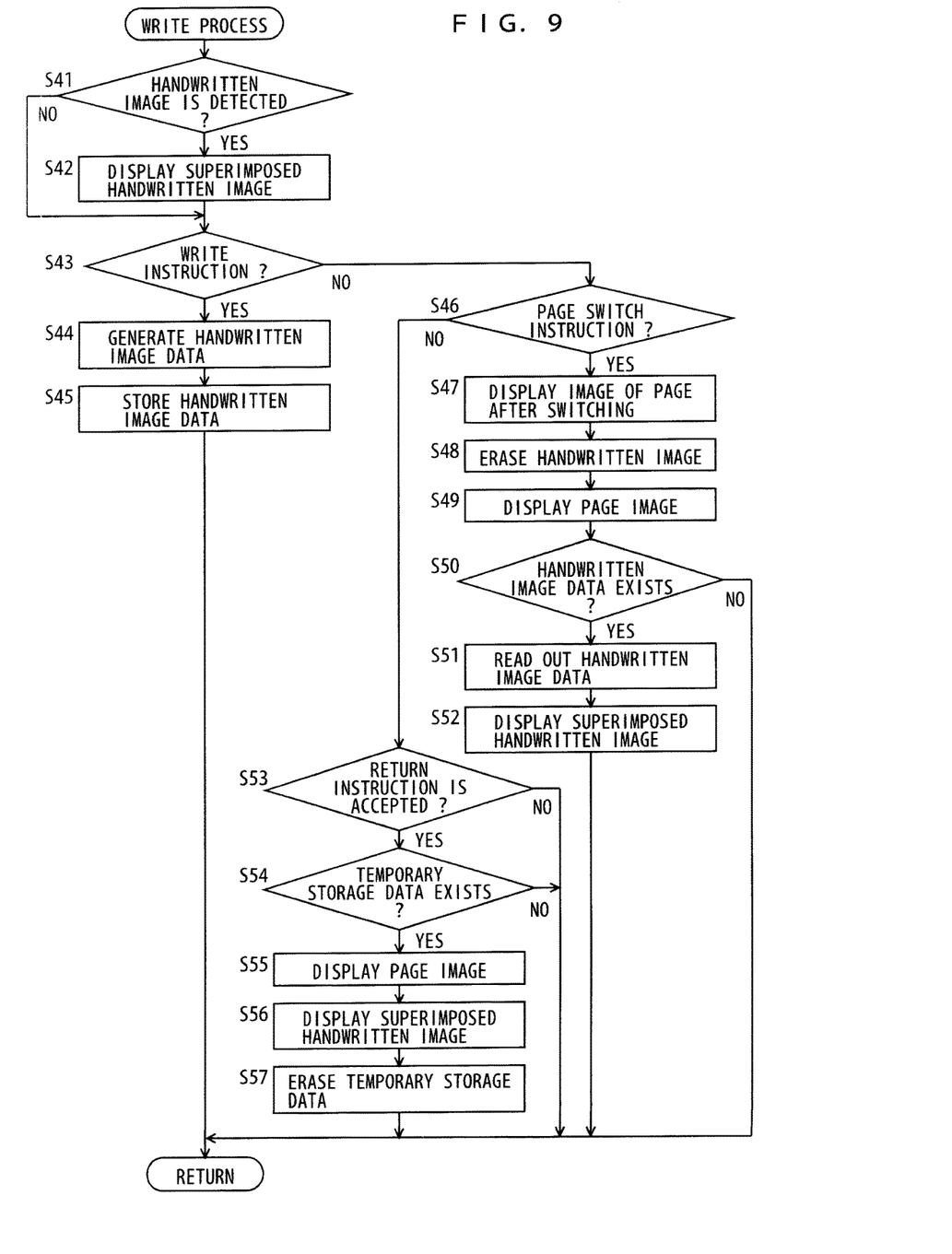
FIG. 9 is a flowchart showing an exemplary flow of a write process.

FIG. 9 is a flowchart showing an exemplary flow of a write process. The write process is a process executed in step S27 shown in FIG. 8. Referring to FIG. 9, CPU 11A determines whether a handwritten image is detected (step S41). If a handwritten image is detected, the process proceeds to step S42. If not, the process proceeds to step S43.

In step S42, the handwritten image detected in step S41 is displayed superimposed on the image displayed on LCD 19A.

In step S43, it is determined whether a write instruction is accepted. If it is detected that the write button of operation portion 23A is pressed, a write mode set instruction is accepted. If a write instruction is accepted, the process proceeds to step S44. If not, the process proceeds to step S46.

In step S44, handwritten image data is generated. Handwritten image data is generated which includes the handwritten image detected in step S41 and the page number of the page displayed on LCD 19A. Immediately after switching from the follow mode to the write mode, the image displayed on LCD 19A is the image of the page displayed in the follow mode, in other words, the image of the same page as the page displayed on presenter device 100. After the write mode is set, the image displayed on LCD 19A is the image of the page designated by the participant who is the operator, in S46 as described later. In the next step S45, the handwritten image data generated in step S44 is stored into EEPROM 17A, and the process returns to the participant-side display process.

On the other hand, in step S46, it is determined whether a page switch instruction is accepted. If a page switch instruction is accepted, the process proceeds to step S47. If not, the process proceeds to step S53. If it is detected that the page down button or the page up button of operation portion 23A is pressed, a page switch instruction is accepted.

In step S47, an image of the page after the switching is read out. An image of the page specified by the page switch instruction is read out among a plurality of pages included in presentation data 161 stored in EEPROM 17A. Specifically, if it is detected that the page down button is pressed, the page having the page number following the page displayed so far is specified. If the page up button is designated, the page having the page number preceding the page displayed so far is specified. In the next step S48, the handwritten image displayed on LCD 19A is erased, and the process then proceeds to step S49. This is to associate one handwritten image with one page. The handwritten image is erased at a timing when the image of the page displayed on LCD 19A is switched.

In step S49, the image of the page read out in step S47 is displayed on LCD 19A, and the process proceeds to step S50. In step S50, it is determined whether handwritten image data including the page number of the displayed page is stored in EEPROM 17A. If handwritten image data is stored in EEPROM 17A, the process proceeds to step S51. If not stored, the process returns to the participant-side display process. Specifically, it is determined whether handwritten image data 163 including the page number of the page displayed in step S47 is stored in EEPROM 17A.

In step S51, handwritten image data 163 including the page number of the page displayed in step S47 is read out from EEPROM 17A. In the next step S51, the handwritten image included in handwritten image data 163 read out in step S51 is displayed superimposed on the image of the page displayed on LCD 19A, and the process then returns to the participant-side display process.

In step S53, it is determined whether a return instruction is accepted. If it is detected that the return button of operation portion 23A is pressed, a return instruction is accepted. If a return instruction is accepted, the process proceeds to step S54. If not, the process returns to the participant-side display process.

The processing from step S54 to step S57 is the same as the processing from step S37 to step S40 in FIG. 8, respectively. Therefore, a description thereof will not be repeated here.

As described above, participant device 100A in the present embodiment receives presentation data from presenter device 100, and, in the follow mode, displays an image of the page having the same page number as that of the page displayed by presenter device 100. In the write mode, participant device 100A displays an image of any given page of a plurality of pages included in the presentation data and detects a handwritten image. Therefore, the user can input a handwritten image when the image of any given page of the presentation data is being displayed. Upon accepting a follow mode set instruction, participant device 100A stores into EEPROM 17A temporary storage data 165 in which the page number of the page displayed at the time when the follow mode set instruction is accepted is associated with the detected handwritten image. Thereafter, upon accepting a return instruction, participant device 100A displays an image in which the handwritten image specified by temporary storage data 165 is superimposed on the image of the page having the page number specified by the stored temporary storage data among a plurality of pages included in presentation data 161. Therefore, the user can display the image of the page having the same page number as that of the page displayed by presenter device 100, during inputting a handwritten image, and thereafter can continuously input the handwritten image input halfway by inputting a return instruction. Accordingly, the number of operations to select a page to be displayed can be reduced.

In addition, in the write mode, participant device 100A displays a handwritten image superimposed on the image of the displayed page among a plurality of pages included in presentation data 161. Therefore, the user can recognize the handwritten image.

When a write instruction is accepted in the write mode, participant device 100A stores into EEPROM 17A handwritten image data 163 in which the handwritten image detected during the write mode is associated with the page number of the page displayed at the time when the write instruction is accepted, among a plurality of pages included in the presentation data. Therefore, the handwritten image input by the user can be associated with the page designated by the user among a plurality of pages.

In the foregoing embodiment, the operation by the user to set a mode either to a write mode or a follow mode is not limited to the operation of pressing any one of the write mode set button, the follow mode set button, and the return button. For example, it may be an operation of touching the touch panel of operation portion 23 with a pen or the like. In particular when the follow mode is set, the write mode may be automatically set when the user is about to write with pen 101A or the like. It may be determined that the user is about to write with pen 101A or the like when the touch panel of operation portion 23 detects pointing with pen 101A or the like.

Although participant device 100A has been illustrated as an example of the display device, the present invention can be understood as a display method that allows participant device 100A to execute the processing shown in FIG. 8 and FIG. 9 as well as a display program to allow CPU 11A controlling participant device 100A to execute the display method, as a matter of course.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A hardware display device displaying presentation data comprising a plurality of pages, comprising:
    a processor that:
        receives the presentation data from a presenter device;
        receives from the presenter device a received page number of a page displayed by the presenter device among the plurality of pages;
        causes the hardware display device to display an image of a page having the received page number in a follow mode and to display an image of any given page among the plurality of pages in a write mode;
        detects a handwritten image in the write mode;
        causes the hardware display device to display the handwritten image superimposed on the image displayed in the write mode;
        switches the page displayed on the hardware display device and erases the handwritten image displayed on the hardware display device when a page switch instruction is accepted in the write mode;
        automatically stores, when a follow mode set instruction is accepted in the write mode, temporary storage data that associates the handwritten image with a page number of a page displayed by the hardware display device at a time when the follow mode set instruction is accepted; and
        causes the hardware display device to switch a displayed image, when a return instruction is accepted in the follow mode, from the image of the page having the received page number to an image obtained by superimposing the handwritten image on an image of the page displayed by the hardware display device at the time when the follow mode set instruction is accepted.

2. The hardware display device according to claim 1, wherein, in the write mode, the processor causes the hardware display device to display the handwritten image detected by the processor so as to be superimposed on the displayed image.

3. The hardware display device according to claim 1, wherein the processor further stores, when a write instruction is accepted in the write mode, handwritten image data in which the handwritten image detected by the processor during the write mode is associated with a page number of a page displayed by the hardware display device at a time when the write instruction is accepted.

4. The display device according to claim 1, further comprising an operation portion comprising a touch panel on a surface of the display, wherein, in the follow mode, the write mode is automatically set when the handwritten image detection portion detects an object touching the touch panel.

5. The hardware display device according to claim 1, wherein the processor erases the temporary storage data when the temporary storage data have been outputted.

6. The hardware display device according to claim 1, wherein, when the follow mode set instruction is accepted in the write mode, the processor causes the hardware display device to switch the displayed image from the image displayed by the hardware display device at the time when the follow mode set instruction is accepted to the image of the page having the received page number.

7. A display method executed in a display device displaying presentation data comprising a plurality of pages, comprising:
    receiving the presentation data from a presenter device;
    receiving from the presenter device a received page number of a page displayed by the presenter device among the plurality of pages;
    displaying an image of the page having the received page number in a follow mode and displaying an image of any given page among the plurality of pages in a write mode;
    detecting a handwritten image in the write mode;
    causing the display device to display the handwritten image superimposed on the image displayed in the write mode;
    switching the page displayed on the display device and erasing the handwritten image displayed on the display device when a page switch instruction is accepted in the write mode;
    automatically storing, when a follow mode set instruction is accepted in the write mode, temporary storage data that associates the handwritten image with a page number of a page displayed at a time when the follow mode set instruction is accepted; and
    switching, when a return instruction is accepted in the follow mode, a displayed image from the image of the page having the received page number to an image obtained by superimposing the handwritten image on an image of the page displayed at the time when the follow mode set instruction is accepted.

8. The display method according to claim 7, wherein the automatically storing comprises displaying the handwritten image detected in the detecting so as to be superimposed on the displayed image in the write mode.

9. The display method according to claim 7, further comprising storing, when a write instruction is accepted in the write mode, handwritten image data in which the handwritten image detected in the detecting during the write mode is associated with a page number of a page displayed at a time when the write instruction is accepted.

10. The display method according to claim 7, further comprising erasing the temporary storage data when the temporary storage data have been outputted.

11. The display method according to claim 7, further comprising switching, when the follow mode set instruction is accepted in the write mode, the displayed image from the image displayed at the time when the follow mode set instruction is accepted to the image of the page having the received page number.

12. A computer-readable non-transitory recording medium encoded with a display program executed in a computer controlling a display device displaying presentation data comprising a plurality of pages, the program causing the computer to execute processing comprising:
    receiving the presentation data from a presenter device;
    receiving from the presenter device a received page number of a page displayed by the presenter device among the plurality of pages;

displaying an image of the page having the received page number in a follow mode and displaying an image of any given page among the plurality of pages in a write mode;

detecting a handwritten image in the write mode;

causing the display device to display the handwritten image superimposed on the image displayed in the write mode;

switching the page displayed on the display device and erasing the handwritten image displayed on the display device when a page switch instruction is accepted in the write mode;

automatically storing, when a follow mode set instruction is accepted in the write mode, temporary storage data that associates the handwritten image with a page number of a page displayed at a time when the follow mode set instruction is accepted; and switching, when a return instruction is accepted in the follow mode, a displayed image from the image of the page having the received page number to an image obtained by superimposing the handwritten image on an image of the page displayed at the time when the follow mode set instruction is accepted.

13. The computer-readable non-transitory recording medium encoded with a display program according to claim 12, wherein the automatically storing comprises displaying the handwritten image detected in the detecting so as to be superimposed on the displayed image in the write mode.

14. The computer-readable non-transitory recording medium encoded with a display program according to claim 12, further comprising storing, when a write instruction is accepted in the write mode, handwritten image data in which the handwritten image detected in the detecting during the write mode is associated with a page number of a page displayed at a time when the write instruction is accepted.

15. The computer-readable non-transitory recording medium encoded with a display program according to claim 12, further comprising erasing the temporary storage data when the temporary storage data have been outputted.

16. The computer-readable non-transitory recording medium encoded with a display program according to claim 12, further comprising switching, when the follow mode set instruction is accepted in the write mode, the displayed image from the image displayed at the time when the follow mode set instruction is accepted to the image of the page having the received page number.

* * * * *